US006530083B1

(12) United States Patent
Liebenow

(10) Patent No.: US 6,530,083 B1
(45) Date of Patent: Mar. 4, 2003

(54) SYSTEM FOR PERSONALIZED SETTINGS

(75) Inventor: Frank Liebenow, Dakota Dunes, SD (US)

(73) Assignee: Gateway, Inc, Poway, CA (US)

( * ) Notice: Subject to any disclaimer, the term of this patent is extended or adjusted under 35 U.S.C. 154(b) by 0 days.

(21) Appl. No.: 09/100,635

(22) Filed: Jun. 19, 1998

(51) Int. Cl.[7] .......................... G06F 3/00; G06F 13/00; H04N 5/445
(52) U.S. Cl. ............................ 725/46; 725/13; 725/35; 725/47
(58) Field of Search ........................... 725/13, 35, 46, 725/47; 348/569, 553, 567, 738

(56) References Cited

U.S. PATENT DOCUMENTS

| | | | |
|---|---|---|---|
| 5,005,084 A | 4/1991 | Skinner | 358/194.1 |
| 5,223,924 A | 6/1993 | Strubbe | 358/86 |
| 5,227,881 A | 7/1993 | Wess et al. | 358/149 |
| 5,597,312 A | 1/1997 | Bloom et al. | 434/362 |
| 5,621,484 A | 4/1997 | Cotty | 348/734 |
| 5,635,992 A | 6/1997 | Kato | 348/655 |
| 5,638,522 A | 6/1997 | Dunsmuir et al. | 395/326 |
| 5,664,046 A | 9/1997 | Abecassis | 386/125 |
| 5,790,935 A * | 8/1998 | Payton | 709/219 |
| 5,945,988 A * | 8/1999 | Williams et al. | 345/747 |
| 6,005,597 A * | 12/1999 | Barrett et al. | 348/564 |
| 6,112,186 A * | 8/2000 | Bergh et al. | 705/10 |

* cited by examiner

Primary Examiner—Andrew Faile
Assistant Examiner—Jason Salce
(74) Attorney, Agent, or Firm—Scott Charles Richardson; Kevin E. West; Suiter & Associates

(57) ABSTRACT

A method and system for adjusting the settings of an information handling system based on the individual user preferences of one or more users is disclosed. An individual user preference profile is retrieved for each identified user of the information handling system. A combined user preference profile is negotiated based on the individual user preference profiles retrieved for each identified user. The settings are then adjusting based on the combined user preference profile. A user interface identifies users of the information handling system. A system controller retrieves an individual user preference profile for each identified user, negotiates a combined user preference profile based on the individual user preference profiles retrieved for each identified user, and adjusts the settings of the information handling system based on the combined user preference profile.

42 Claims, 5 Drawing Sheets

SYSTEM FOR PERSONALIZED SETTINGS

FIELD OF THE INVENTION

The present invention relates generally to information handling systems, and more specifically to a system and method for determining a single set of settings for an information handling system based on a negotiation of one or more user preference profiles.

BACKGROUND OF THE INVENTION

Information handling systems, including convergent television/computer systems, multimedia personal computers, audio and video equipment, televisions, and the like typically include a number of parameters or settings which may be adjusted by a user of the system according to his or her personal preferences. For example, information handling systems typically allow users to adjust audio/video settings such as volume level, base level, treble level, brightness, and contrast to enhance the user's viewing and listening experience. Many information handling systems also allow adjustment of system parameters or settings including definition of preferred channel or station lists for television or radio or specification of email and program settings for communication or information processing. The settings, once adjusted, are usually stored in a non-volatile memory until reset or readjusted by a user.

A particular information handling system may, however, be utilized by many different users over a given period of time. Thus, for optimum use and enjoyment of the system, each user must often readjust some or all of the system's settings prior to his or her use. Because the information handling system have many settings which must be readjusted, this process may waste a substantial amount of the user's time which could be better spent using and enjoying the system. Further, many information handling systems, such as, for example, convergent television/ computer systems, audio and video equipment, televisions, or automobile stereo systems may be used by more than one user at a time. Often, these users may have widely differing setting preferences which must be compromised if all are to receive optimum use and enjoyment of the system. This compromise has traditionally been accomplished manually by allowing one of the users to adjust the system settings until all or a majority of the users agree that the settings are acceptable. Besides being time consuming, such manual adjustment of the settings often fails to provide maximum satisfaction to all users.

Consequently, it would be advantageous to provide a system for determining optimum values for the settings of an information handling system based on a negotiation of the preferences of each user of the system and then automatically adjusting the settings accordingly.

SUMMARY OF THE INVENTION

The present invention is directed to a method for adjusting the system parameters or settings of an information handling system based on the individual user preferences of one or more users. The method includes the steps of identifying users of the information handling system, retrieving an individual user preference profile for each identified user wherein the individual user preference profile includes setting preferences preselected by the user, negotiating a combined user preference profile including settings for the information handling system based on the individual user preference profiles retrieved for each identified user, and adjusting the settings of the information handling system based on the combined user preference profile. The method may be tangibly embodied on a medium readable by the information handling system capable of causing the information handling system to execute the method.

The present invention is also directed to a system for adjusting the settings of an information handling system based on the individual user preferences of one or more users. The system includes a user interface for identifying users of the information handling system, one or more individual user preference profiles each including a number of setting preferences preselected by the user, and a system controller for retrieving setting preferences from the individual user preference profile for each identified user and negotiating settings for the information handling system based on the individual user preference profiles retrieved for each identified user. The system controller may then use the combined user preference profile to adjust the system settings of the information handling system.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

The present invention provides a method and system for adjusting the settings of an information handling system based on the individual user preferences of one or more users. An individual user preference profile is retrieved for each identified user of the information handling system. A combined user preference profile is negotiated based on the individual user preference profiles retrieved for each identified user. The system settings may then be adjusted based on the combined user preference profile. Preferably, the system and method of the present invention may be employed by any information handling system including, but not limited to, computer based information handling systems such as computer systems and convergent television/computer systems as well as television systems, audio systems, video systems, or the like. Reference will now be made in detail to the presently preferred embodiment of the invention, an example of which is illustrated in the accompanying drawings.

Figure 1:
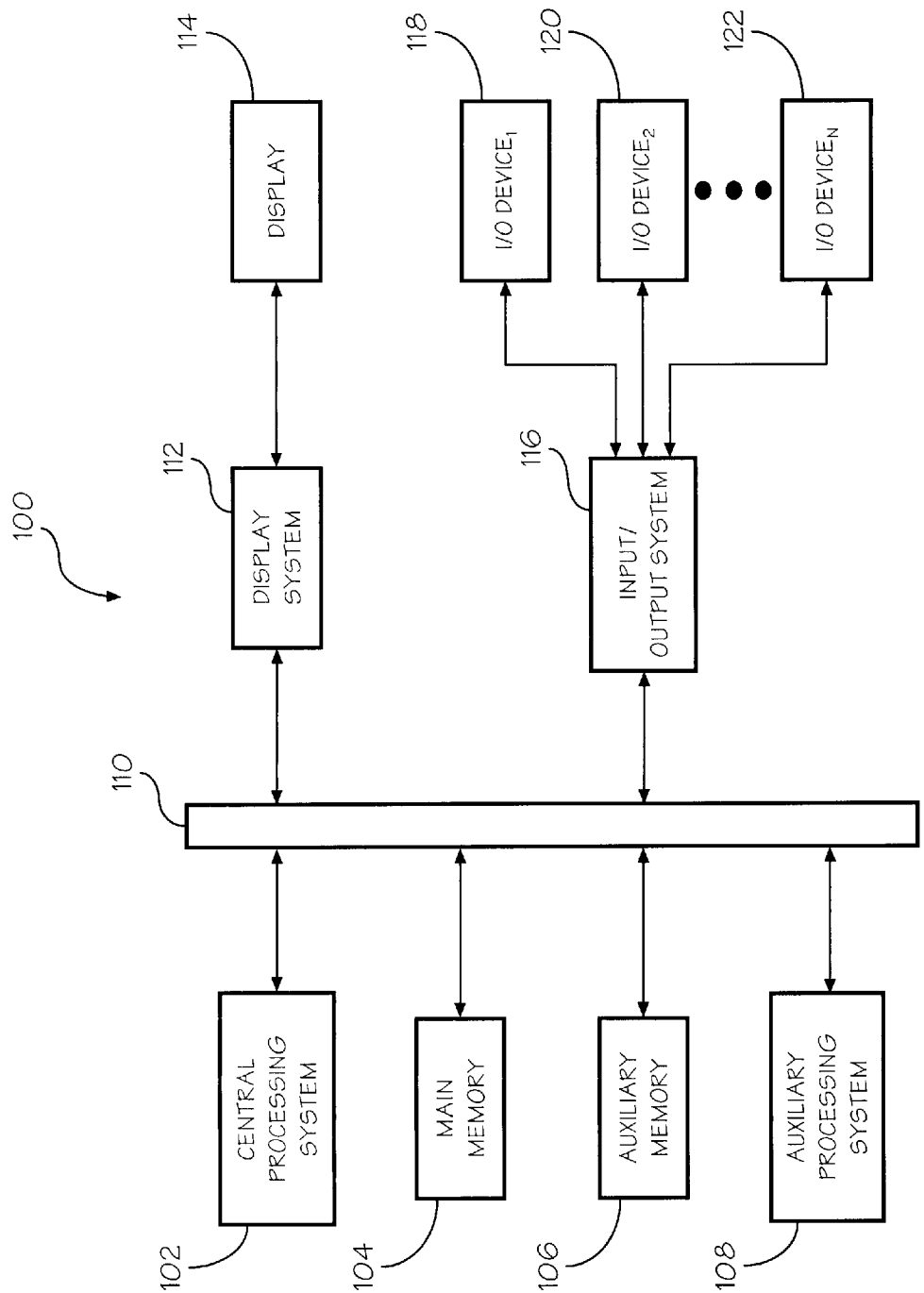
FIG. 1 is a block diagram depicting a typical hardware environment of a computer-based information handling system.

Referring now to FIG. 1, a hardware system in accordance with the present invention is shown. The hardware system shown in FIG. 1 is generally representative of the hardware architecture of a computer-based information handling system. The information handling system may be, for example a convergent television/computer system (e.g., PC/TV convergence system) which is adapted to integrate multiple information and entertainment media such as, for example, television, telephony, Internet, e-mail, and interactive gaming into a single platform. The information handling system may function as a central control device to control peripheral components of the convergent television/computer system such as an interactive entertainment (video gaming) apparatus, a video cassette recorder (VCR), compact disk or video laser disk players, a digital versatile disk (DVD) or readable/writeable digital versatile disk (DVD+RW) device, or audio equipment such as an audio processor, audio amplifier, surround sound or AC-3 type processor.

The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, auxiliary memory 106, and an auxiliary processing system 108 as required. The main memory 104 provides storage of instructions and data for programs executing on the central processing system 102. The main memory 104 is typically semiconductor based memory such as dynamic random access memory (DRAM) and or static random access memory (SRAM). The auxiliary memory 106 provides storage of instructions and data that are loaded into the main memory 104 before execution. The auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The hardware system 100 further includes a display system 112 for connecting to a display device 114, and an input/output (I/O) system 116 for connecting to one or more I/O devices 118, 120 up to N number of I/O devices 122. The display system 112 may comprise a video display adapter having all of the components for driving the display device, including video random access memory (VRAM), buffer, and graphics engine as desired. The display device 114 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 116 may comprise one or more controllers or adapters for providing interface functions between the one or more I/O devices 118–122. For example, the input/output system 116 may comprise a serial port, parallel port, infrared port, network adapter, printer adapter, radio-frequency (RF) communications adapter, universal asynchronous receiver-transmitter (UART) port, television (TV) tuner, audio adapter, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, audio system, microphone, speaker, etc. The input/output system 116 and I/O devices 118–122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
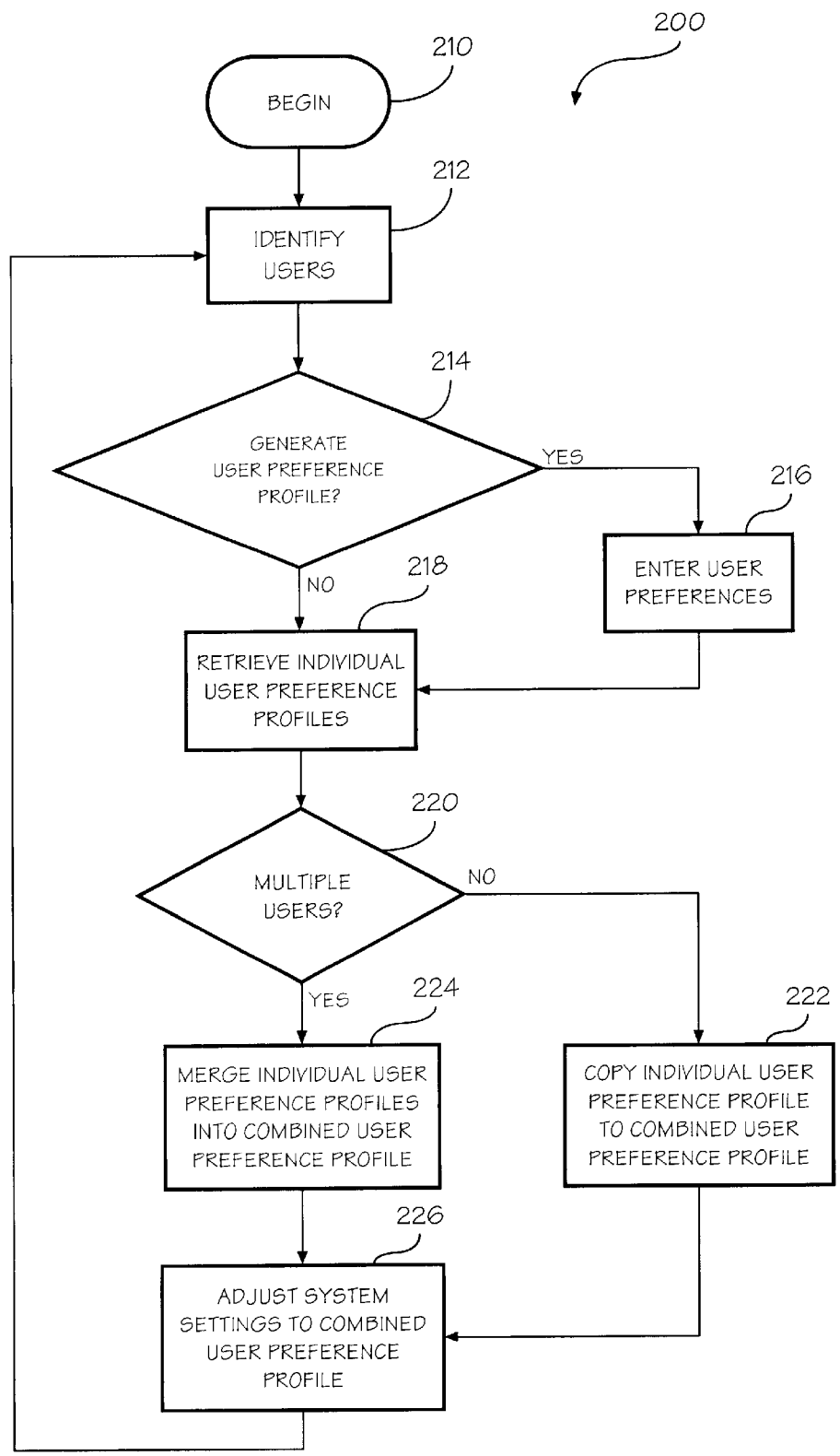
FIG. 2 is a flow diagram depicting the method of the present invention.

Referring now to FIG. 2, a flow diagram depicting the method for providing personalized settings of the present invention is shown. Upon initiation of the method 200 at step 210, one or more users of the information handling system 100 are identified at step 212. Preferably, the identity of each user is saved as additional users are identified. Each user may be prompted to provide his or her identity by entering a user name (i.e., "Jane" or "John") or by entering an enumeration (i.e., "User 1" or "User 2") via a user interface (see FIGS. 4 and 5). For example, each user may select his or her identity from a list of known users displayed on a display 114 (see FIG. 1) or may enter his or her identity by typing it into the system via an input/output device 118, 120 & 122 such as a keyboard, remote control unit, or the like (see FIG. 1). Alternatively, a user may provide his or her identity by depressing one of a number of user switches arrayed on the user interface (e.g., in a car audio system). Each of the switches may be preassigned to a particular user and may be labeled (i.e., "USER 1", "USER 2", etc.) accordingly.

Upon identifying a user, a determination is made at step 214 whether an individual user preference profile exists or must be generated for that user. For example, it may be necessary to generate a new user preference profile for a new user who has not before entered his or her preferences. Similarly, a known user, who has previously generated a profile, may wish to adjust preferences he or she has already entered if, for example, the user's viewing or listening preferences have changed. If a user profile does not exist or the user wishes to update the profile, the user may be prompted to enter his or her individual user preferences at step 216. The entered preferences are preferably stored as an individual user preference profile which is associated with that user via the identification entered by the user at step 212. The individual user preference profile for each identified user may then be retrieved at step 218.

Once all users have been identified and individual user preference profiles are retrieved for each user, a combined user preference profile including settings for the system may be negotiated, at steps 220 through 224, based on the individual user preference profiles retrieved for each identified user. The combined user preference profile may be used to adjust the settings of the system at step 226. Preferably, a determination is made at step 220 whether a single user or multiple users were identified at step 212. If only one user was identified at step 212, the individual user preference profile retrieved for that user is copied to the combined user preference profile at step 222. If, on the other hand, more than one user was identified at step 212, a combined user preference profile may be generated at step 224 by merging the setting preferences contained in the individual user preference profile of each identified user. The system settings may then be adjusted to the combined user preference profile at step 226. Preferably, if an additional user later joins the already identified users, his or her personal preferences may be merged with those of the existing users to generate a new combined user preference profile so that the system settings may be readjusted to reflect the preferences of all of the users. Similarly, when a user leaves and is no longer using the system, the absence of that user may be identified at step 212 so that the system may be adjusted accordingly to more accurately reflect the preferences of the remaining users.

In an exemplary embodiment, a combined user preference profile may be saved at step 224 as an individual user preference profile. This allows two or more individual user preference profiles to be merged together to form an individual user preference profile for a group of users. Such a user preference profile may be identified by a user name (i.e., "Smith Family" or "Mom and Dad") or by enumeration (i.e., "USER 1" or "USER 2"). An individual user preference profile may also be generated at steps 214 and 216 for a group of users by entering the individual user preferences for each user within the group. The preferences entered for each user may then be merged, and the merged user preferences saved as an individual user preference profile associated with that group of users. It should also be appreciated that existing individual user preference profiles for two or more groups (and individual users) may be merged together to generate a user preference profile for a group consisting of the users in the original groups (and any individual users).

Preferably, one or more groups of users may be identified at step 212 (along with any individual users of the system). For example, a user within a group may select his or her group's identity from a list of known users displayed on a display 114 (see FIG. 1) or may enter his or her group's identity by typing it into the system via an input/output device 118, 120 & 122 such as a keyboard, remote control unit, or the like (see FIG. 1). Alternatively, a user may provide his or her group's identity by depressing one of a number of user switches arrayed on the user interface (e.g., in a car audio system). Each of the switches may be preassigned to a particular user (e.g., and individual user or group) and may be labeled (i.e., "USER 1", "USER 2", etc.) accordingly. The group's individual user preference profile may then be retrieved at step 218 and used to negotiate a combined user preference profile at steps 220 through 224. In negotiating the combined user preference profile, each individual user preference profile may be weighted to reflect the number of individual users in the group with which is associated. For example, preferences from a user preference profile for a group consisting of three individual users may be weighted more heavily than preferences from a user preference profile for a group consisting of two individual users or a single individual user. In this manner, each user's individual preferences may be more equally represented by the combined user preference profile.

Figure 3:
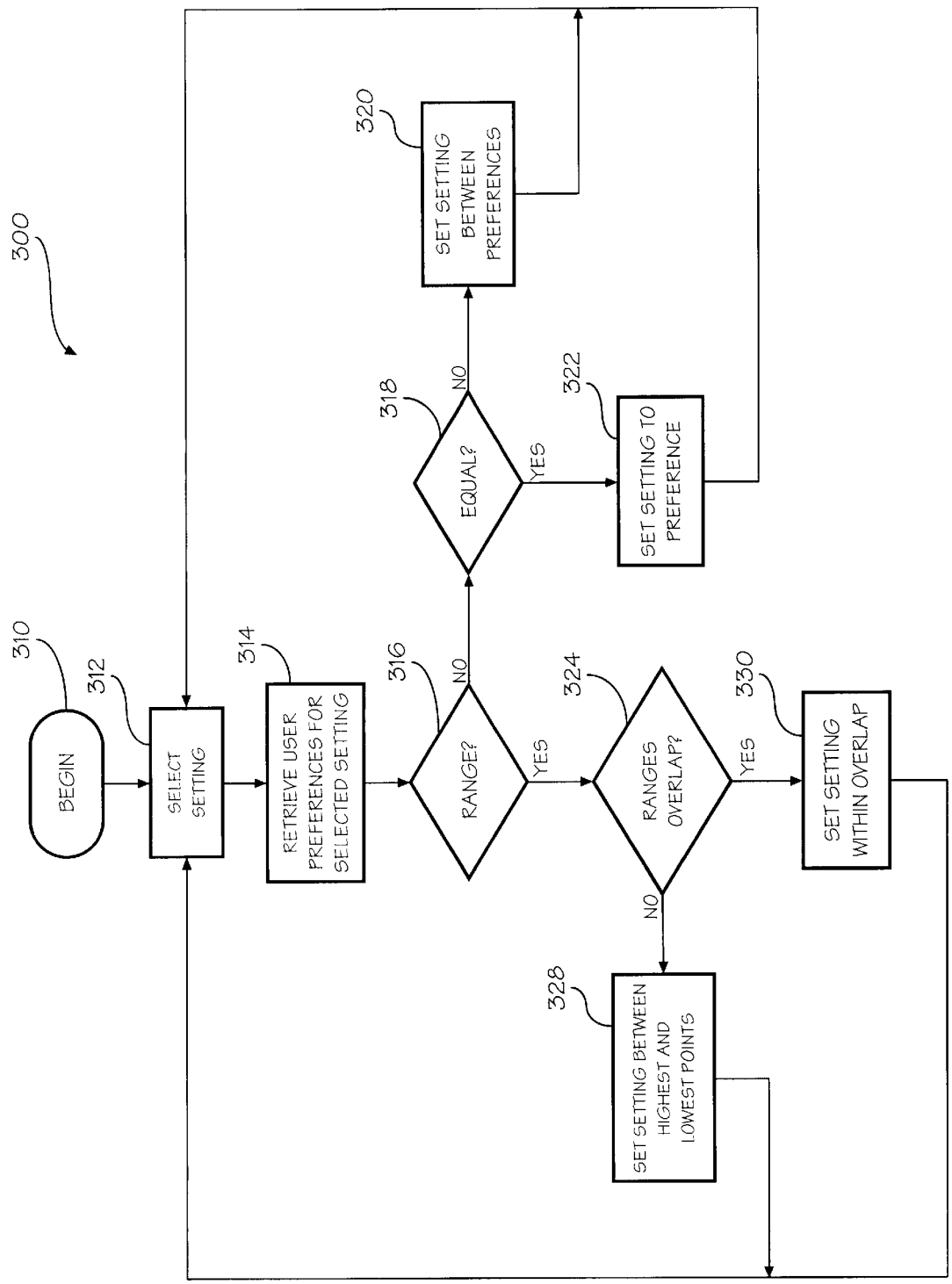
FIG. 3 is a flow diagram depicting a method for accomplishing the merging step of the method shown in FIG. 3.

Referring now to FIG. 3, a method for accomplishing the merging step 224 of the method shown in FIG. 2 is illustrated. The method 300 merges the user preferences from the individual user preference profiles of two or more users (e.g., individual users or groups) to generate a combined user preference profile. The merged preferences from the combined user preference profile may then be used to adjust the settings of the information handling system. Upon initiation of the method 300 at step 310, a setting or parameter for which a preference of the combined user preference profile is to be set is selected at step 312. The user preference corresponding to the setting selected in step 312 is retrieved from the individual user preference profile of each identified user at step 314. Preferably, user preferences may be specified as either a single value or a range of values which are acceptable to the user. Thus, a given preference may be specified as a single value or a range of values by all users of the system. For example, a first user may specify a value for volume level of 45% of the maximum level while a second user may specify a value of 55% of the maximum level and a third user may specify a value of 65% of the maximum level. Similarly, the first user may specify that a range of values for the volume level, for example, from 15% to 35% of the maximum level, is acceptable while a second user may specify that a range of from 25% to 40% is acceptable and a third user may specify that a range of from 25% to 35% is acceptable. Alternately, one or more users may specify a single value for a given preference while other users may specify a range of values for that preference. Thus, a first user may specify a range of values for brightness of a display of from 30% to 50% of the maximum level, while a second user might specify a single value, for example, 45% of the maximum level. Consequently, a determination may be made at step 316 whether any of the user preferences retrieved in step 314 specify a range of values for the setting selected in step 312. If all of the user preferences are specified as single values, an additional determination is made at step 318 whether the user preferences are substantially equal. If all of the user preferences are determined to be substantially equal, the value of the setting in the combined user preference profile may be set, at step 322, to the value of any of the user preferences (since they are substantially equal). If all of the user preferences are determined to be not substantially equal, the value of the setting in the combined user preference profile may be set, at step 320, between the highest and lowest values of the user preferences according to predetermined criteria. If on the other hand, a range of values is specified for one or more of the user preferences, a determination is made at step 324 whether all of the specified ranges overlap. If all of the specified ranges do not overlap, the value of the setting in the combined user preference profile may be set, at step 328, between the highest and lowest values of the ranges according to predetermined criteria. If the specified ranges do overlap, the value of the setting may be set, at step 330, within the overlap of the ranges according to predetermined criteria. After the selected setting is set in the combined user preference profile, a new setting is selected at step 312, and the method is repeated until values for all settings in the combined user preference profile are determined.

Criteria for setting or determining a value for each setting in the combined user preference profile may vary depending on the type of setting to be determined. In many cases, the setting in the combined user preference profile will be a direct average of the user preferences for all identified users. For example, a first user may specify a volume level of 25% of the maximum level while a second user may specify a volume level of 35% of the maximum level. The direct average of these values may be used to set the volume setting in the combined user preference profile to 30% of the maximum level. Alternatively, the setting in the combined user preference may be a weighted average of the user preferences for all identified users. The setting value may, for example, be weighted based on information from sources such as physiological data, surveys of focus groups, or the like, to predict what would normally be acceptable to various types of users. For example, it may be known that listeners who prefer low volumes typically cannot tolerate high volumes. Thus, the volume setting may be adjusted to a predetermined formula based on this data. Wherein one or more user preferences are specified as ranges of values, similar criteria may be used. For example, to determine the value of the setting in the combined user preference profile, a direct average or weighted average may be used to determine the midpoint of each range. These midpoints may then be averaged to determine the appropriate value for the setting. Similarly, wherein the information handling system is a television, convergent television/computer system, audio receiver, or video receiver, a user may specify a list of favorite channels or stations in his or her user preference profile. These individual lists may be merged and duplicate preferences deleted during the merging step 224 (see FIG. 2) to create a combined channel list.

Figure 4:
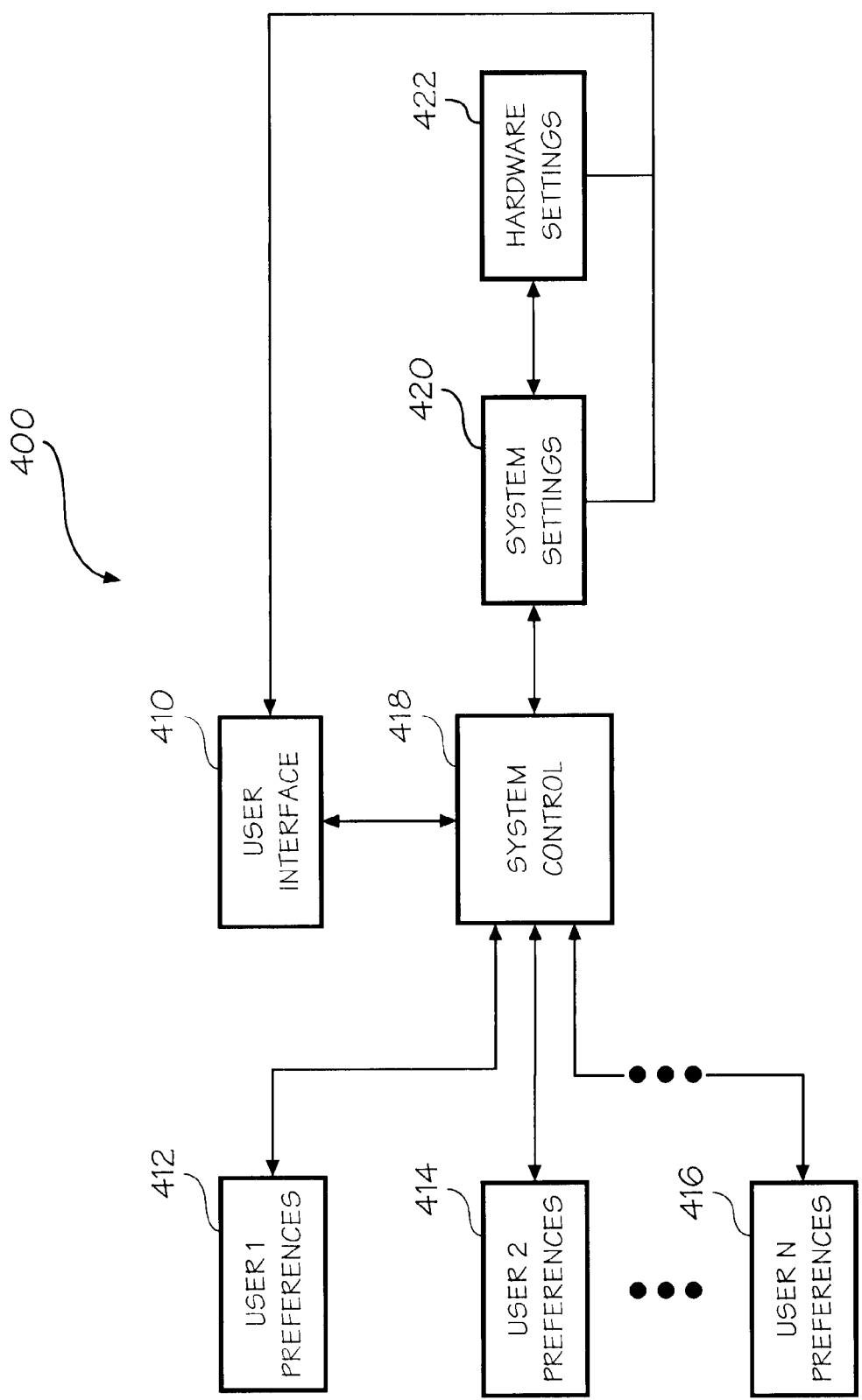
FIG. 4 is a block diagram depicting the system according to an exemplary embodiment of the present invention.

Referring now to FIG. 4, a system for implementing the method of the present invention is shown. The system 400, as shown in FIG. 4, may be used to adjust the settings of the computer-based information handling system 100, shown in FIG. 1, based on the individual user preferences of one or more users. Alternately, the system 400, may be used to adjust the settings of non-computer based information handling systems including, for example, audio/video receivers, audio systems, car audio systems, television systems, and the like. As shown in FIG. 4, the system 400 may include a user interface 410 for identifying users (e.g., individual users or groups) of the information handling system 100. Preferably, the user interface 410 allows each user to generate an individual user preference profile 412, 414 & 416 which is stored and associated with that user. For example, the user interface 410 may prompt a user for his or her identity or the identity of his or her group. The system 400 may accept identification by name (i.e., "Jane", "John", "Smith Family", "Children", etc.) or by enumeration (i.e., "USER 1" or "USER 2"). Once the user is identified, the system 400 may provide one or more setup screens displayed on a display 114 of the information handling system 100 (see FIG. 1). The user (e.g., the individual user or each individual user within the group) may be prompted to enter personal setting preferences for selected system, audio and video settings. Preferably, each user may adjust these preferences at any time if his or her viewing or listening preferences should change. These preferences may then be merged if necessary (e.g., for a group of users) and stored in the main or auxiliary memory 104 & 106 (see FIG. 1) as an individual user preference profile 412, 414 & 416 which is associated with that user via the identification entered by the user. The user may return the settings of the system to his or her individual settings (or the settings negotiated for the group) by informing the system, via the user interface 410, that he or she (or his or her group) is the current user. The user interface may, for example, allow the user to select his or her identity (or the identity of his or her group) from a list of known users or may allow the user to enter his or her identity (or the identity of his or her group) by typing it into the system via a keyboard. Alternatively, the user interface 410 may provide a number of user switches each of which may be assigned to a particular user. These switches may be labeled (i.e., "USER 1", "USER 2, etc.). A user may provide his or her identity (or the identity of his or her group) to the system by depressing the appropriate switch.

A system controller 418 may retrieve the individual user preference profile 412, 414 & 416 for each identified user. Preferably, each individual user preference profile 412, 414 & 416 includes system setting preferences preselected by the user (or group of users) via the user interface 410. If a single user is identified, the system controller 418 may adjust the system settings 420 to the preferences specified by the individual user preference profile 412, 414 & 416 for that user. If two or more users are identified, the system controller 418 may negotiate system settings 420 for the information handling system based on the individual user preference profiles 412, 414 & 416 retrieved for each identified user. Preferably, the system controller 418 adjusts the system settings 420 by implementing the methods shown in FIGS. 2 and 3. The system settings 420, when set, may cause various hardware settings 422 to be adjusted to comply with the user preferences. Preferably, the system and hardware settings 420 & 422 may be displayed to the user via the user interface 410.

Figure 5:
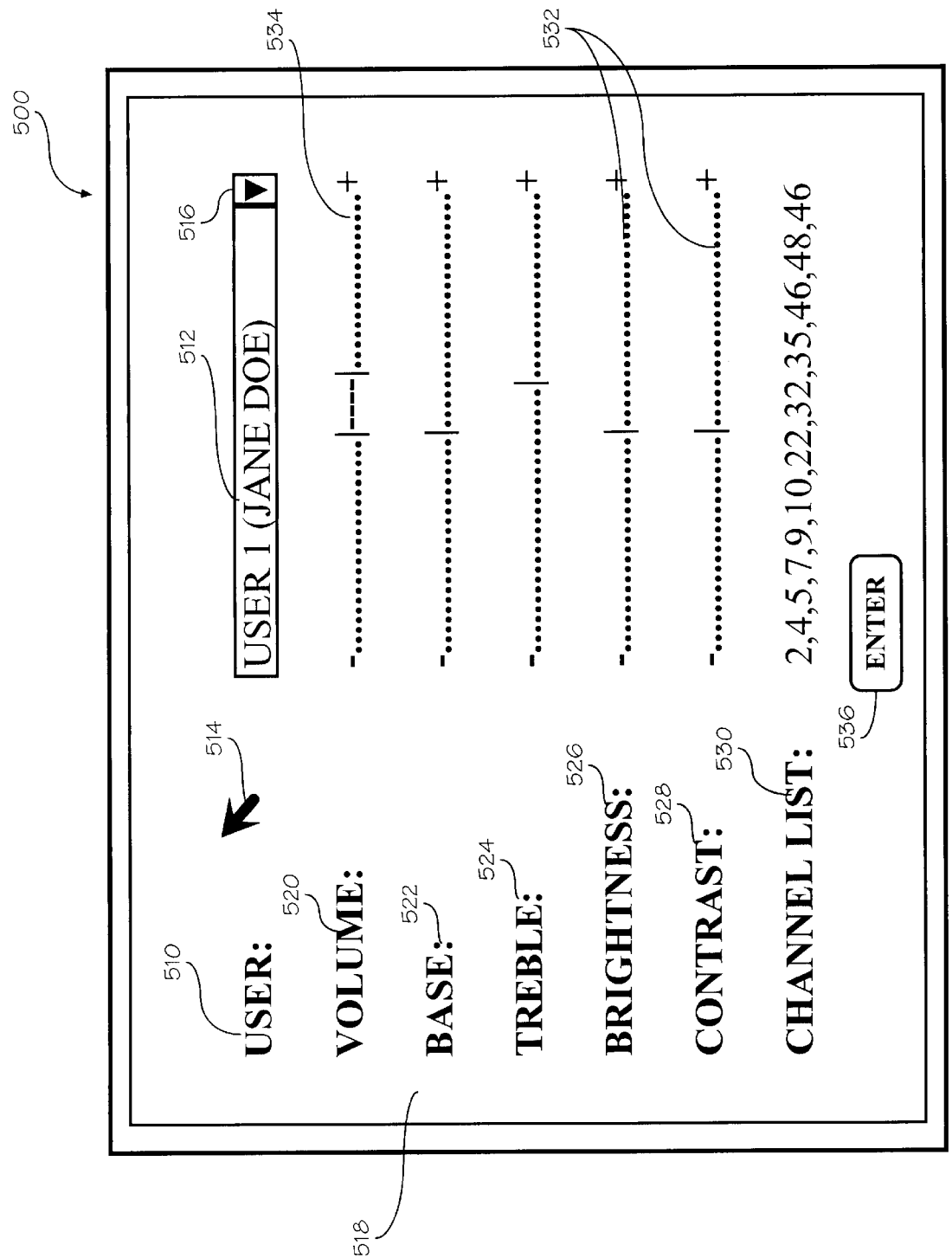
FIG. 5 is a diagrammatic view of an exemplary user interface of the system shown in FIG. 4.

Referring now to FIG. 5, an exemplary user interface is shown. The user interface 500 may be, for example, a graphical user interface displayed on the display 114 of the hardware system 100 of the information handling system shown in FIG. 1. The user interface 500 allows a user to identify himself or herself (or his or her group) to the system 400 (see FIG. 4). For example, as shown in FIG. 5, the user interface 500 may display a prompt 510 requesting the identity of the user. The user may enter his or her identity (or the identity of his or her group) in a user identity field 512 by name (i.e., "Jane Doe") or by enumeration (i.e., "User 1") or both. Preferably, the user interface 500 allows the user to enter his or her identity by typing it into the user identity field 512 via a keyboard. Alternately, the user may select his or her identity (or the identity of his or her group) from a list of known users (not shown) displayed by the user interface 500. The known user list may, for example, be provided via a pull down menu which may be opened by positioning a pointer or cursor 514 over the scroll button 516 of the user identity field 512 using a coordinate input device such as a mouse, trackball, trackstick, or the like (not shown) and selecting this button 516.

Once the user is identified, the user interface 500 may display the existing individual user preference profile 518 for that user. Preferably, the user interface 500 may provide multiple screens or a menu system as necessary to facilitate entering or modifying of user preferences by a user. The individual user preference profile 518 may include user preferences previously entered by the user such as, for example, volume, base, and treble settings 520, 522 & 524 for an audio system, brightness and contrast settings 526 & 528 for a display or video system, and a channel or station list 530 for a television or radio receiver. Each user preference may be displayed graphically as a scale or graph 532 & 534. Alternatively, the value of each setting may be displayed alphanumerically. Preferably, the user may enter a single value 532 or a range of values 534 for any or all of the preferences displayed. If all preferences are acceptable to the user, he or she may exit the user interface 500 whereupon the user's identity and individual user preference profile are provided to the system. This maybe accomplished by selecting a predetermined area of the user interface such as the "ENTER" button 536 shown in FIG. 5. Each user of the information handling system may enter his or her identity in a similar fashion.

Although the invention has been described with a certain degree of particularity, it should be recognized that elements thereof may be altered by persons skilled in the art without departing from the spirit and scope of the invention. Embodiments of the present invention may be implemented as sets of instructions resident in the main memory 104 of the one or more computer systems configured generally as described in FIG. 1. Until required by the computer system, the set of instructions may be stored in another computer readable medium or memory, for example in a hard disk drive, or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions may be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, chemically, physically, optically, or holographically so that the medium carries computer readable information. The present invention may also be implemented via hardware which would not require storage of a set of instructions in memory.

It is believed that the system and method of the present invention and many of their attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for adjusting the settings of an information handling system based on the individual user preferences of one or more users, the method comprising the steps of:

identifying at least one user of the system;

retrieving an individual user preference profile for each identified user wherein the individual user preference profile includes setting preferences preselected by the user;

negotiating a combined user preference profile including settings for the system based on the individual user preference profiles retrieved for each identified user; and adjusting the settings of the system based on the combined user preference profile.

2. A method according to claim 1, further comprising the step of generating an individual user preference profile for an identified user by inputting setting preferences selected by the user.

3. A method according to claim 1, further comprising the step of storing the combined user preference profile.

4. A method according to claim 1, wherein the negotiating step comprises the steps of:

determining the number of users identified;

wherein one user is identified, making the combined user preference profile the individual user preference profile for the user; and wherein more than one user is identified, merging the setting preferences contained in the individual user preference profile of each user to generate the combined user preference profile.

5. A method according to claim 4, wherein the merging step comprises the steps of:

selecting a setting to be merged;

retrieving a setting preference corresponding to the selected setting from the individual user preference profile of each identified user;

wherein the retrieved setting preferences are substantially equal, adjusting the selected setting to the setting preference of one of the users; and wherein the retrieved setting preferences are not substantially equal, adjusting the selected setting to be between the highest and lowest of the setting preferences.

6. A method according to claim 5, wherein the merging step further comprises the steps of:

wherein the retrieved setting preferences of the identified users specify a range of settings, determining if the ranges overlap;

wherein all of the ranges of settings overlap, adjusting the setting to be within the overlap of the ranges; and wherein any of the ranges of settings do not overlap any of the other ranges of settings, adjusting the setting to be between the highest and lowest setting preferences within the ranges.

7. A method according to claim 6, wherein the adjusting steps further comprise adjusting the selected setting to an average of the retrieved setting preferences.

8. A method according to claim 6, wherein the adjusting steps further comprise adjusting the selected setting to a weighted average of the retrieved setting preferences.

9. A method according to claim 6, wherein the adjusting step further comprises adjusting the selected setting based on physiological data.

10. A computer readable medium whose contents cause a computer-based information handling system to execute method steps for adjusting the settings of the information handling system based on the individual user preferences, the method steps comprising:

identifying at least one user of the information handling system;

retrieving an individual user preference profile for each identified user wherein the individual user preference profile includes setting preferences preselected by the user;

negotiating a combined user preference profile including setting preferences for the information handling system based on the individual user preference profile retrieved for each identified user; and adjusting the settings of the information handling system according to the combined user preference profile.

11. The computer readable medium according to claim 10, whose contents further cause the computer-based information handling system to perform the step of generating an individual user preference profile for an identified user by inputting setting preferences selected by the user.

12. The computer readable medium according to claim 10, whose contents further cause the computer-based information handling system to perform the step of storing the combined user preference profile.

13. The computer readable medium according to claim 10, wherein the negotiating step comprises the steps of:
  determining the number of users identified;
  wherein one user is identified, making the combined user preference profile the individual user preference profile for the user; and
  wherein more than one user is identified, merging the setting preferences contained in the individual user preference profile of each user to generate the combined user preference profile.

14. The computer readable medium according to claim 13, wherein merging step comprises the steps of:
  selecting a setting to be merged;
  retrieving a setting preference corresponding to the selected setting from the individual user preference profile of each identified user;
  wherein the retrieved setting preferences are substantially equal, adjusting the selected setting to the setting preference of one of the users; and
  wherein the retrieved setting preferences are not substantially equal, adjusting the selected setting to be between the highest and lowest of the setting preferences.

15. The computer readable medium according to claim 14, wherein the merging step further comprises the steps of:
  wherein the retrieved setting preferences of the identified users specify a range of settings, determining if the ranges overlap;
  wherein all of the ranges of settings overlap, adjusting the setting to be within the overlap of the ranges; and
  wherein any of the ranges of settings do not overlap any of the other ranges of settings, adjusting the setting to be between the highest and lowest setting preferences within the ranges.

16. The computer readable medium according to claim 15, wherein the adjusting steps further comprise adjusting the selected setting to an average of the retrieved setting preferences.

17. The computer readable medium according to claim 15, wherein the adjusting steps further comprise adjusting the selected setting to a weighted average of the retrieved setting preferences.

18. The computer readable medium according to claim 15, wherein the adjusting steps further comprise adjusting the selected setting based on physiological data.

19. A system for adjusting the settings for an information handling system based on the individual user preferences of one or more users comprising:

means for identifying at least one user of the information handling system;
  means for retrieving an individual user preference profile for each identified user wherein the individual user preference profile includes setting preferences preselected by the user;
  means for negotiating a combined user preference profile including setting preferences for the information handling system based on the individual user preference profile retrieved for each identified user; and
  means for adjusting the settings of the information handling system according to the combined user preference profile.

20. The system according to claim 19, further comprising means for generating an individual user preference profile for an identified user by inputting setting preferences selected by the user.

21. The system according to claim 19, further comprising means for storing the combined user preference profile.

22. The system according to claim 19, wherein the negotiating means comprises:
  means for determining the number of users identified;
  means, wherein one user is identified, for making the combined user preference profile the individual user preference profile for the user; and
  means, wherein more than one user is identified, for merging the setting preferences contained in the individual user preference profile of each user to generate the combined user preference profile.

23. The system according to claim 22, wherein the merging means further comprises:
  means for selecting a setting to be merged;
  means for retrieving a setting preference corresponding to the selected setting from the individual user preference profile of each identified user;
  means, wherein the retrieved setting preferences are substantially equal, for adjusting the selected setting to the setting preference of one of the users; and
  means, wherein the retrieved setting preferences are not substantially equal, for adjusting the selected setting to be between the highest and lowest of the setting preferences.

24. The system according to claim 23, wherein the merging means further comprises:
  means, wherein the retrieved setting preferences of the identified users are a range of settings, for determining if the ranges overlap;
  means, wherein all of the ranges of settings overlap, for adjusting the setting to be within the overlap of the ranges; and
  means, wherein any of the ranges of settings do not overlap any of the other ranges of settings, for adjusting the setting to be between the highest and lowest setting preferences within the ranges.

25. The system according to claim 24, wherein the adjusting means adjust the selected setting to an average of the retrieved setting preferences.

26. The system according to claim 24, wherein the adjusting means adjust the selected setting to a weighted average of the retrieved setting preferences.

27. The system according to claim 24, wherein the adjusting means adjust the selected setting based on physiological data.

28. A system for adjusting the settings of an information handling system based on the individual user preferences of one or more users comprising:

a user interface for identifying at least one user of the information handling system;

a user preference profile for each user identified via the user interface, said user preference profile including setting preferences preselected by the user; and a controller operatively coupled to the user interface for adjusting the settings of the information handling system in accordance with a combined user preference profile based on the user preference profile retrieved for a plurality of identified users.

29. The system according to claim 28, wherein the user interface is displayed on a display of the information handling system.

30. The system according to claim 28, wherein the combined user preference profile is stored in a memory of the information handling system.

31. The system according to claim 28, wherein the controller merges the user preference profile for each user to generate the combined user preference profile for adjusting the settings of the information handling system.

32. The system according to claim 28, wherein a user preference contained in the user preference profile of a user is specified as a range of values.

33. A computer-based information handling system comprising:

a central processing system for processing information;

memory interconnected with said central processing system for storing information;

a display system interconnected with the central processing system for displaying information;

an input/output system interconnected with the processing system for inputting and outputting information; and a system for adjusting the settings of the information handling system based on the individual user preferences of one or more users further comprising:

a user interface for identifying at least one user of the information handling system;

a user preference profile for each user identified via the user interface, said user preference profile including setting preferences preselected by the user; and a controller operatively coupled to the user interface for adjusting the settings of the information handling system in accordance with a combined user preference profile based on the user preference profile retrieved for a plurality of identified users.

34. The computer-based information handling system according to claim 33, wherein the user interface is displayed via the display system.

35. The computer-based information handling system according to claim 33, wherein the combined user preference profile is stored in the memory.

36. The computer-based information handling system according to claim 33, wherein the controller merges the user preference profile for each user to generate the combined user preference profile for adjusting the settings of the information handling system.

37. The computer-based information handling system according to claim 33, wherein a user preference contained in the combined user preference profile of a user is specified as a range of values.

38. A method according to claim 1, wherein the settings comprise audio settings including volume level.

39. The computer readable medium according to claim 10, wherein the settings comprise email program settings to specify preferred features of an email application.

40. The system according to claim 19, wherein the settings comprise video settings including brightness.

41. The system according to claim 28, wherein the setting preferences comprise system output level settings.

42. The system according to claim 33, wherein the settings comprise a brightness setting for the display system.

* * * * *